United States Patent
Hammitt et al.

(10) Patent No.: US 6,799,304 B2
(45) Date of Patent: Sep. 28, 2004

(54) ARBITRATION WITHIN A MULTIPORT AMBA SLAVE

(75) Inventors: Gregory F. Hammitt, Eagan, MN (US); John M. Nystuen, Burnsville, MN (US)

(73) Assignee: LSI Logic Corporation, Milpitas, CA (US)

( * ) Notice: Subject to any disclaimer, the term of this patent is extended or adjusted under 35 U.S.C. 154(b) by 28 days.

(21) Appl. No.: 10/262,180

(22) Filed: Oct. 1, 2002

(65) Prior Publication Data

US 2004/0064615 A1 Apr. 1, 2004

(51) Int. Cl.$^7$ .............................................. G06F 17/50
(52) U.S. Cl. ................................................ 716/1; 716/8
(58) Field of Search ...................... 716/1, 8; 370/462, 370/463, 431, 442

(56) References Cited

U.S. PATENT DOCUMENTS

| | | | | |
|---|---|---|---|---|
| 4,586,128 A | * | 4/1986 | DeWoskin | 710/113 |
| 4,809,217 A | * | 2/1989 | Floro et al. | 710/52 |
| 5,689,644 A | * | 11/1997 | Chou et al. | 370/392 |
| 6,035,360 A | * | 3/2000 | Doidge et al. | 710/107 |
| 6,237,130 B1 | * | 5/2001 | Soman et al. | 716/10 |
| 6,366,583 B2 | * | 4/2002 | Rowett et al. | 370/401 |

OTHER PUBLICATIONS

"AMBA™ Specification" (Rev. 2.0), May 13, 1999, 230 pages.

* cited by examiner

*Primary Examiner*—Vuthe Siek
*Assistant Examiner*—Sun James Lin
(74) *Attorney, Agent, or Firm*—Christopher P. Maiorana, P.C.

(57) ABSTRACT

A circuit generally comprising an interface circuit and an arbitration circuit is disclosed. The interface circuit may be couplable between a peripheral device and a plurality of ports. The arbitration circuit may be coupled to the interface circuit. The arbitration circuit may be configured to (i) store a plurality of associations between a plurality of time slots and the ports, (ii) check the associations in a subset comprising at least two of the time slots in response to receiving an arbitration request from a first requesting port of the ports, and (iii) generate a grant for the first requesting port to communicate with the peripheral device in response to the first requesting port matching at least one of the associations in the subset.

25 Claims, 12 Drawing Sheets

ARBITRATION WITHIN A MULTIPORT AMBA SLAVE

FIELD OF THE INVENTION

The present invention relates to peripheral resource sharing generally and, more particularly, to arbitration functionability within a multiport advanced micro-controller bus architecture (AMBA) slave device.

BACKGROUND OF THE INVENTION

Multiport slave peripheral circuit designs are commonly a single monolithic block within an application specific integrated circuit (ASIC). The monolithic block approach creates difficulties in reusing all or portions of the design since the design is customized for the original ASIC application. Where portions of the design are reused, maintenance becomes difficult where the reused blocks are modified in order to be fully integrated with other blocks in the new application.

Another limitation of the monolithic block approach is encountered where bus traffic at a particular port varies among and/or within applications. For example, a multiport Advanced High-performance Bus (AHB) application can use a bus A to support very bursty but short traffic requests while a bus B uses 64-bit, long linear requests. A monolithic block optimized for bus A will not perform as well with bus B. What is desired is a reusable multiport slave peripheral architecture where an arbitration functional can be scaled to meet a wide number of bus interfaces to any one or more different bus designs and peripheral designs.

SUMMARY OF THE INVENTION

The present invention concerns a circuit generally comprising an interface circuit and an arbitration circuit. The interface circuit may be couplable between a peripheral device and a plurality of ports. The arbitration circuit may be coupled to the interface circuit. The arbitration circuit may be configured to (i) store a plurality of associations between a plurality of time slots and the ports, (ii) check the associations in a subset comprising at least two of the time slots in response to receiving an arbitration request from a first requesting port of the ports, and (iii) generate a grant for the first requesting port to communicate with the peripheral device in response to the first requesting port matching at least one of the associations in the subset.

The objects, features and advantages of the present invention include providing arbitration functionability within a multiport advanced micro-controller bus architecture (AMBA) slave device that may provide (i) a variable number of ports, (ii) different port types, (iii) different peripheral types, (iv) a user definable arbitration priority for each port, (v) compile time selection of a number of ports, (vi) compile time selection of a datapath width, (vii) programmable time slots, (viii) multiple time slot look-ahead in a time slot wheel to determine a grant, (ix) a fixed priority arbitration when no port in the time slot wheel may be requesting, (x) following an AMBA design methodology, (xi) reuse of basic building blocks in different applications and/or (xii) reduced development costs compared with custom designs.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
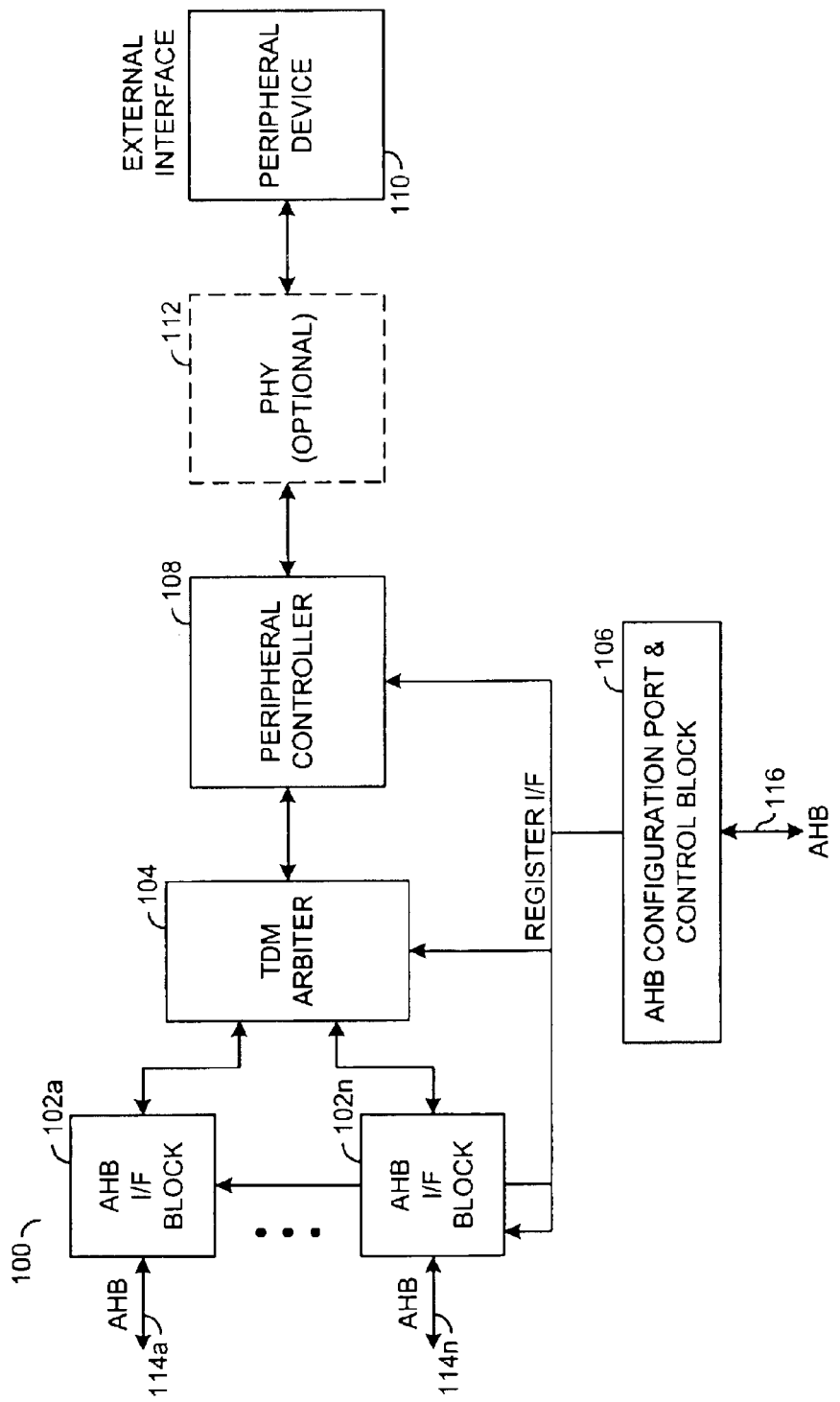
FIG. 1 is a block diagram of an example implementation of a system in accordance with a preferred embodiment of the present invention.

Referring to FIG. 1, a block diagram of an example implementation of a system 100 is shown in accordance with a preferred embodiment of the present invention. The system 100 generally comprises one or more circuits 102a–n, a circuit 104, a circuit 106, a circuit 108, and a circuit 110. An optional circuit 112 may be included between the circuit 108 and the circuit 110.

Each circuit 102a–n may be implemented as a bus interface circuit, line buffer port or block. Each circuit 102a–n may have an interface 114a–n connectable to one of several busses (not shown). The bus interfaces 114a–n may be configured for similar types of busses or different types of busses. In one embodiment, the bus interface circuits 102a–n may comply with an Advanced High-Performance Bus (AHB) defined in an "Advanced Microcontroller Bus Architecture (AMBA) Specification", revision 2.0, 1999, published by ARM Limited, Cambridge, England and hereby incorporated by reference in its entirety. Other types of bus standards may be implemented to meet the design criteria of a particular application. Generally, two to eight AHB bus interface circuits 102a–n may be integrated into a normal sized system 100. More than eight bus interface circuits 102a–n may also be integrated to meet the criteria of a large system 100.

The circuit 104 may be implemented as an arbiter circuit or block. In one embodiment, the arbiter circuit 104 may implement a time division multiplex (TDM) arbitration. The TDM arbiter circuit 104 generally interfaces to several of the AHB bus interface circuits 102a–n, the circuit 106 and the circuit 108. The TDM arbiter circuit 104 may prioritizes requests from the AHB bus interface circuits 102a–n with a pre-programmed method of selection and passes a highest priority request on to the circuit 108.

The circuit 106 may be implemented as a configuration port and control circuit or block. An interface 116 may be provided in the control circuit 106 for interfacing to a bus (not shown) In one embodiment, the control circuit 106 may comply with the AHB portion of the AMBA specification. In another embodiment, the control circuit 106 may comply with an Advanced Peripheral Bus (APB) defined in the AMBA specification. The control circuit 106 may be configured to interface to other bus standards to meet the design criteria of a particular application. The control circuit 106 is generally configured to read and/or write data to and from control registers in the AHB bus interface circuits 102a–n, the TDM arbiter circuit 104, and/or the circuit 108.

The circuit 108 may be implemented as a peripheral controller of block. In one embodiment, the peripheral controller circuit 108 may be configured as a double data rate (DDR) memory controller. In other embodiments, the peripheral controller circuit 108 may be configured as a random access memory (RAM) controller, a read-only memory (ROM) controller, a mass memory drive controller, an input/output device controller, a communications link controller, or the like.

The circuit 110 may be implemented as a peripheral device or block. The peripheral device 110 may be configured as a DDR memory, a RAM memory, a ROM memory, a mass memory media, a sensor, an actuator, a receive, a transmitter, or the like. The peripheral device 110 may be coupled to the peripheral controller 108 through one or more unidirectional and/or bidirectional links.

The circuit 112 may be implemented as an optional physical interface circuit or block. The physical interface circuit 112 may provide communications and/or translations between the peripheral controller circuit 108 and the peripheral device 110. For example, the physical interface circuit 112 may provide voltage translations from a 3.3 volt environment of the peripheral controller circuit 108 to a 1.8 volt environment of the peripheral device.

The general purpose of the TDM arbiter circuit 104 may be to enable two or more of the AHB bus interface circuits (ports) 102a–n to share a single peripheral. The TDM arbiter circuit 104 may receive simultaneous requests from the ports 102a–n and determine which particular port 102a–n may be granted access the peripheral controller circuit 108. The TDM arbiter circuit 104 may steer address, control, and write data from the particular port 102a–n receiving the access grant to the peripheral controller circuit 108. The TDM arbiter circuit 104 may also provide a decode functionality to create enable signals that may steer read data from the peripheral device 110 back to the individual ports 102a–n.

Figure 2:
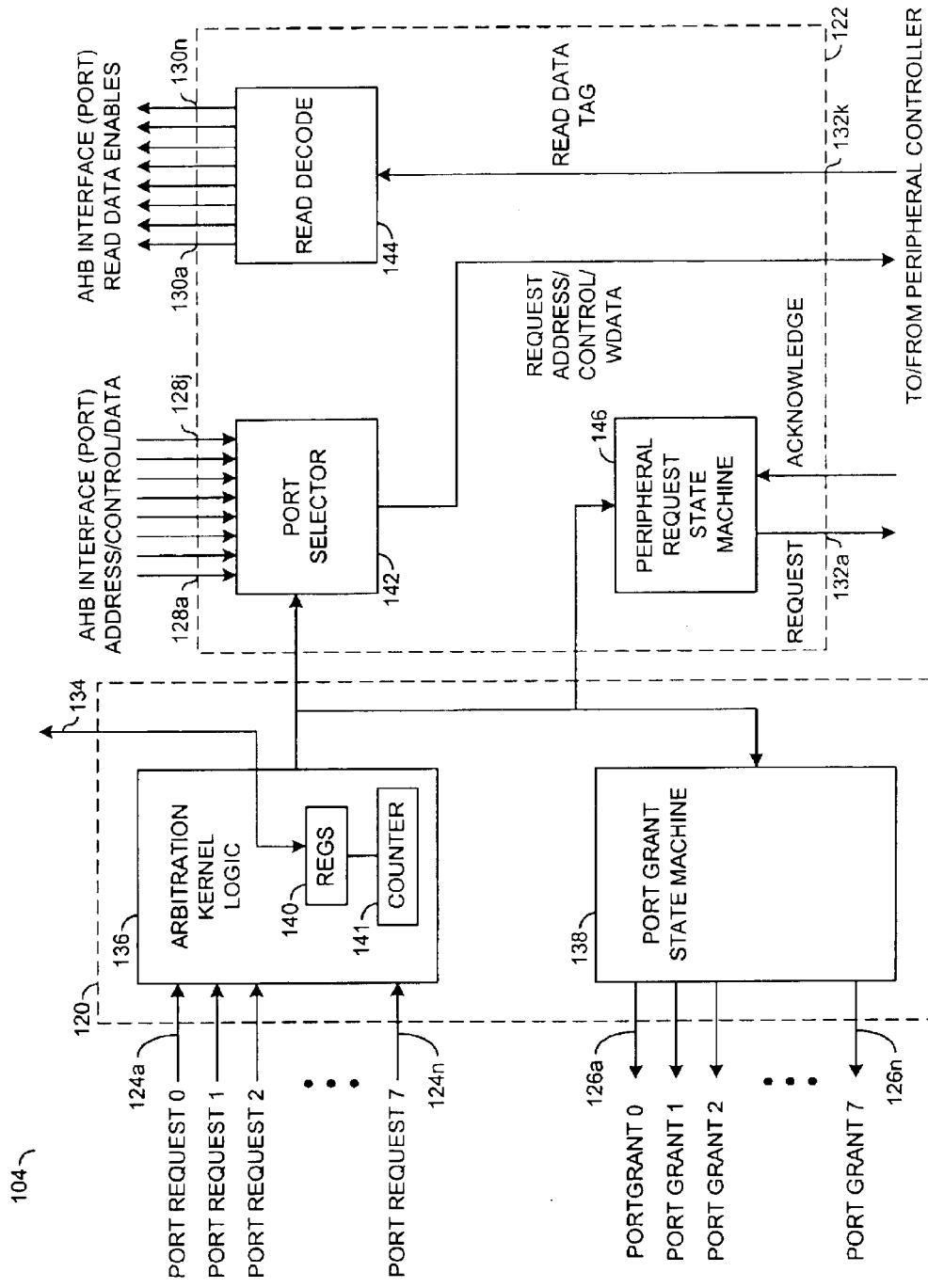
FIG. 2 is a block diagram of an example implementation of a time division multiplex (TDM) arbiter circuit.

Referring to FIG. 2, a block diagram of an example implementation of the TDM arbiter circuit 104 is shown. The TDM arbiter circuit 104 generally comprises a circuit 120 and a circuit 122. The circuit 120 may be implemented as an arbitration circuit. The circuit 122 may be implemented as an interface circuit.

A set of interfaces 124a–n may be provided in the arbitration circuit 120 for receiving signals (e.g., PORT_REQUEST_n, where n is an integer) from the AHB bus interface circuits 102a–n. Another set of interfaces 126a–n may be provided in the arbitration circuit 120 for generating and presenting signals (e.g., PORT_GRANT_n, where n is an integer) to the AHB bus interface circuit 102a–n. The interface circuit 122 may include a set of interfaces 128a–j to receive signals (e.g., address signals, control signals, and data signals) from each of the AHB bus interface circuits 102a–n. A set of interfaces 130a–n may be provided in the interface circuit 122 to generate and present signals (e.g., read data enable signals) to the AHB bus interface circuits 102a–n. Another set of interfaces 132a–k may be provided in the interface circuit 122 to send and receive signals (e.g., request signals, acknowledge signals, request address/control/write data signals and read data tag signals) to and from the peripheral controller circuit 108. An interface 134 may be provided in the arbitration circuit 120 to send and receive signals (e.g., control data) to and from the control circuit 106.

The arbitration circuit 120 generally comprises a circuit 136 and a circuit 138. The circuit 136 may be implemented as an arbitration kernel logic circuit or block. The arbitration kernel logic circuit 136 may be configured to implement one or more arbitration schemes. The arbitration kernel logic circuit 136 may include one or more registers 140 and a priority counter 141 used in the arbitration schemes or functions. Partitioning of the arbitration circuit 120 into the arbitration kernel logic circuit 136 and the circuit 138 may isolate modifications to the arbitration scheme to design changes only in the arbitration kernel logic circuit 136.

The circuit 138 may be implemented as a state machine circuit or block. In one embodiment, the state machine circuit 138 may be implemented as a port grant state machine circuit. The port grant state machine circuit 138 may be configured to control a handshake mechanism between the TDM arbiter circuit 104 and the individual AHB bus interface circuits 102a–n to adjust a timing in granting access to the peripheral controller circuit 108. The port grant state machine circuit 138 may be coupled to the arbitration kernel logic circuit 136 to receive information regarding which port (AHB bus interface circuit) 102a–n may be receive the grant.

When the arbitration kernel logic circuit 136 detects a request from one or more ports 102a–n, the arbitration kernel logic circuit 136 may determine which particular port 102a–n may be granted. The port grant state machine circuit 138 may control when the grant may be issued. Three conditions generally determine when the grant may be issued. A first condition may be that the peripheral controller circuit 108 may be ready to accept a next transaction from a port 102a–n.

A second condition for granting access may be dependent upon a reception of a write burst type of request. For a write burst of 8 (e.g., internal burst of 4), there may be a single 1× clock delay before the next grant is issued. The delay may provide enough time to transfer four data beats at a 2× clock rate. For a write burst of 4 (e.g., internal burst of 2), there may be sufficient time to steer two data beats of write data from the requesting port 102a–n to the peripheral controller circuit 108 since, with the address and control, the write data may be transferred at the 2× clock rate.

A third condition for granting access may be a lock transfer condition generally indicated to the TDM arbiter circuit 104 by the current port 102a–n communicating with the peripheral controller circuit 108. During a lock transfer, the port grant state machine circuit 138 may not present the grant to a new port 102a–n until the current port 102a–n has released the lock. The third condition may prohibit other ports 102a–n from corrupting the data within the locked transaction.

The interface circuit 122 generally comprises a circuit 142, a circuit 144 and a circuit 146. The circuit 142 may be implemented as a port selector circuit or block. The port selector circuit 142 may be coupled to the arbitration kernel circuit 136 to receive information of a current arbitration grantee or winner. The port selector circuit 142 may be configured to perform an n to 1 multiplexing, where n is the number of ports 102a–n. The port selector circuit 142 may multiplex the write signals with a different timing than the address signals and the control signals, since the write signals may be clocked on a particular clock signal (e.g., the 2× clock) while the address and the control signals may use another clock signal (e.g., the 1K clock).

The circuit 144 may be implemented as a read decode circuit or block. The read decode circuit 144 may be configured to generate and present the read data enable signals at the interfaces 130a–n based upon the read data tag signal at the interface 132k and the current arbitration grantee. The read decode circuit 144 may assert a single read data enable signal corresponding to the port 102a–n for which read data from the peripheral device 110 may be destined.

The circuit 146 may be implemented as a state machine circuit or block. In one embodiment, the state machine circuit 146 may be configured as a peripheral request state machine circuit. The peripheral request state machine circuit 146 may be configured to control a handshake mechanism between the TDM arbiter circuit 104 and the peripheral controller circuit 108. The handshake mechanism generally determines when a next grant may be issued to an AHB bus interface circuit 102a–n.

A signal (e.g., an acknowledge signal) from the peripheral controller circuit 108 may indicate when the peripheral controller circuit 108 may be able to receive another transaction from a port 102a–n. The peripheral controller circuit 108 generally should be able to receive an entire transaction before completing the handshake. The acknowledge signal may be active or asserted for a cycle of the 1× clock to acknowledge a signal (e.g., a request signal) from the peripheral request state machine circuit 146. At a reset, the peripheral request state machine circuit 146 may assume that the peripheral controller circuit 108 may accept a first request and thus not wait for assertion of the acknowledge signal.

Table I and Table II generally show multiple compile options that may be used in compiling the TDM arbiter circuit 104 for a particular application. There may be two compile options that may be set prior to the compile of a Register Transfer Language (RTL) code defining the TDM arbiter circuit 104. The options may provide configurability but may not be programmable after compile. A first option may set a number of ports 102a–n that may be supported. Generally, there may be between 2 and 8 ports 102a–n supported although a larger number of ports 102a–n may be provided within the scope of the present invention. A second option may set a write data width and a byte write enable bus width and hence the multiplexers in the port selector circuit 142 may also be effected by various compile time configuration options.

TABLE I

| Configuration (Verilog define) | Number of Ports |
| --- | --- |
| AP_NUM_PORTS_2 | 2 |
| AP_NUM_PORTS_3 | 3 |
| AP_NUM_PORTS_4 | 4 |
| AP_NUM_PORTS_5 | 5 |
| AP_NUM_PORTS_6 | 6 |
| AP_NUM_PORTS_7 | 7 |
| AP_NUM_PORTS_8 | 8 |

TABLE II

| Configuration (Verilog define) | Write Data Bus Width | Byte Write Enable Bus Width |
| --- | --- | --- |
| AP_128_DDR_16_BURST_8 | 31:0 | 3:0 |
| AP_128_DDR_32_BURST_4 | 63:0 | 7:0 |
| AP_256_DDR_32_BURST_8 | 63:0 | 7:0 |
| AP_256_DDR_64_BURST_8 | 127:0 | 15:0 |
| AP_256_DDR_72_BURST_4 | 143:0 | 15:0 |

Figure 3:
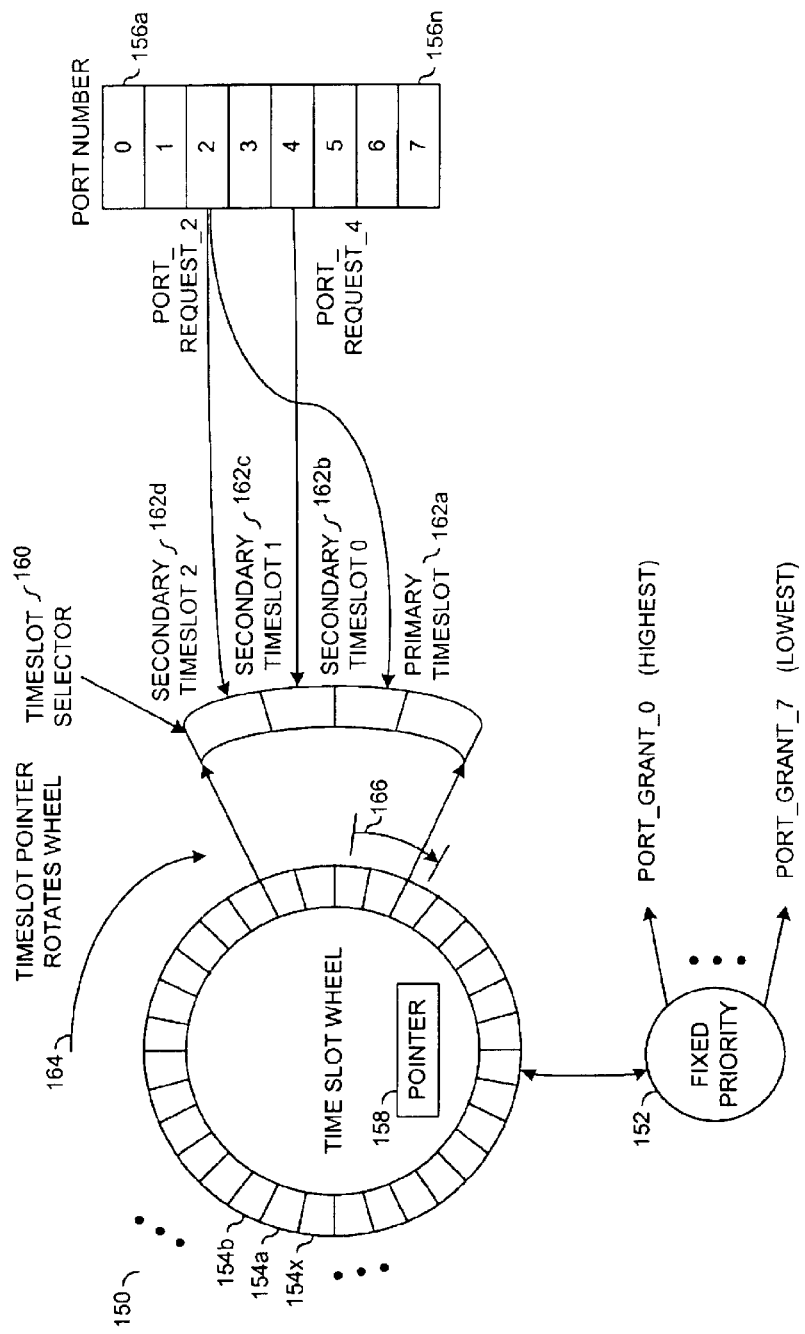
FIG. 3 is a diagram illustrating an example implementation of an arbitration scheme.

Referring to FIG. 3, a diagram illustrating an example implementation of an arbitration scheme is shown. The arbitration scheme may be implemented in the arbitration kernel circuit 136. The arbitration kernel circuit 136 generally uses a rotating programmable priority scheme 150 to provide a minimum bandwidth to each of the connected ports 102a–n. While no request is present for the rotating scheme 150, the arbitration kernel circuit 136 may default to a fixed priority scheme 152. The rotating arbitration scheme 150 generally uses the priority counter 141 (FIG. 2) to address a programmable memory (e.g., registers 140) whose output indicates a high priority port 102a–n. The programmable memory 140 may allow a use of an arbitrary number of time slots 154a–x. Where each port 102a–n is assigned an equal number of time slots 154a–x, the rotating scheme 150 may operate as a round-robin scheme. Since there may be more time slots 154a–x than ports 102a–n, a programmer may allocate the additional time slots 154a–x such that a higher percentage of time slots 154a–x are associated to the higher priority ports 102a–n.

In one embodiment, the arbitration circuit 120 may relate eight ports 102a–n among thirty-two time slots 154a–x to implement a time division multiplex arbitration scheme. The programmable memory may be implemented as a 96-bit register, subdivided into thirty-two 3-bit sub-fields. Each sub-field generally identifies an identification number 156a–n of a port 102a–n with a time slot 154a–x. To form the programmable memory, three 32-bit registers 140 may be concatenated to form the 96-bit register. The programmable memory may be loaded via the AHB control circuit 106.

The programmer may allocate the available time slots 154a–x to the ports 102a–n in any ratio. Each time slot 154a–x may be programmed with any port number 156a–n. Preferably, the port numbers 156a–n may be scattered approximately uniformly across the time slots 154a–x.

The rotating programmable priority scheme 150 generally uses a modulo 32 time slot pointer 158. The time slot pointer 158 may be incremental in integer units (e.g., 1, 2, 3, 4, etc.). The time slot pointer 158 generally controls a multiplexer or selector 160 that identifies a subset of the time slots 154a–x. A particular time slot 154 of the thirty-two time slots 154a–x pointed to by the time slot pointer 158 may operate as a current time slot, also referred to as a primary time slot 162a.

One or more (e.g., three) other time slots 154a–x may also be within the subset defined by the time slot selector 160. The additional time slots 154a–x may be logically contiguous or adjacent to the primary time slot 162a. A first additional time slot 154a–x within the time slot selector subset 160 may be referred to as a secondary time slot_0 (e.g., reference number 160b). A second additional time slot 154a–x within the time slot selector subset 160 may be referred to as a secondary time slot_1 (e.g., reference number 160c). A third additional time slot 154a–x within the time slot selector subset 160 may be referred to as a secondary time slot_2 (e.g., reference number 160d).

The arbitration kernel logic circuit 136 may check for a match between a port request and the contents of any of the time slots 162a–d. If a particular port 102a–n allocated to the time slot 154a–x acting as the current primary time slot 162a has a request active or asserted, the particular port 102a–n may be serviced and the time slot pointer 158 may increment by one unit to rotate the time slots 154a–x one slot clockwise, as indicated by arrow 164. The time slot pointer 158 may be evaluated and incremented in a clock period when a grant may be issued. The port grant state machine circuit 138 generally determines when the grant may be presented to the ports 102a–n as described above.

If the primary time slot port does not have an active request, the arbitration kernel logic circuit 136 may check a next time slot port in order (e.g., the secondary time slot_0). An active request by the secondary time slot_0 port may result in the requesting port being serviced and the time slot pointer 158 may be incremented by two units. Incrementing two units may cause the time slots 154a–x to rotate clockwise by two slots, as indicated by arrow 166.

If the primary time slot port and the secondary time slot_0 port do not have an active request, the port 102a–n allocated to the secondary time slot_1 may be checked for and asserted request. If the secondary time slot_1 port may be requesting service, the rotating arbitration scheme 150 may issue the grant to the requesting secondary time slot_1 port. The time slot pointer 158 may also be incremented by three units.

If the primary time slot port, the secondary time slot_0 port and the secondary time slot_1 port do not have a request asserted, the secondary time slot_2 port may be checked. An active request by the secondary time slot_2 port may be granted. The time slot pointer 158 may also be incremented by four units.

Where none of the time slot ports have an active request, the time slot pointer 158 may increment by four units. The fixed priority scheme 152 may then be used to assign the grant based upon a predetermined priority. In the fixed priority scheme 152, the port 102a–n having the port number 0 may be the highest priority and port number 7 may be the lowest priority. Other fixed priority schemes may be implemented to meet the criteria of a particular application. The fixed priority scheme 152 generally insures that a request may be granted if any one or more ports 102a–n request access to the peripheral device 110. However, the fixed priority scheme 152 may not guarantee that a low priority port may ever be serviced. If none of the eight ports have an active request, arbitration may return to the rotating arbitration scheme 150 and the time slot pointer 158 may be incremented by four units.

A summary of the registers 140 may be provided in the following Table III and Table IV:

TABLE III

| Address (HEX) | Register Name | R/W | Reset State |
|---|---|---|---|
| Periph_Base | Time slot priority register R0 | R/W | 0x0000_0000 |
| Periph_Base+4 | Time slot priority register R1 | R/W | 0x0000_0000 |
| Periph_Base+8 | Time slot priority register R2 | R/W | 0x0000_0000 |

TABLE IV

| BIT | Reg. R0 | Reg. R1 | Reg. R2 |
|---|---|---|---|
| 0 | Time Slot (TS) 0 | TS10 | TS21 |
| 1 | | TS11 | |
| 2 | | | TS22 |
| 3 | TS1 | | |
| 4 | | TS12 | |
| 5 | | | TS23 |
| 6 | TS2 | | |
| 7 | | TS13 | |
| 8 | | | TS24 |
| 9 | TS3 | | |
| 10 | | TS14 | |
| 11 | | | TS25 |
| 12 | TS4 | | |
| 13 | | TS15 | |
| 14 | | | TS26 |
| 15 | TS5 | | |
| 16 | | TS16 | |
| 17 | | | TS27 |
| 18 | TS6 | | |
| 19 | | TS17 | |
| 20 | | | TS28 |
| 21 | TS7 | | |
| 22 | | TS18 | |
| 23 | | | TS29 |
| 24 | TS8 | | |
| 25 | | TS19 | |
| 26 | | | TS30 |
| 27 | TS9 | | |
| 28 | | TS20 | |
| 29 | | | TS31 |
| 30 | TS10 | | |
| 31 | | TS21 | |

Each time slot 154a–x may be 3-bits wide to hold a port number 156a–n. Time slot priority register R0 may contain time slots (TS) 0–9 and a lower two bits of a time slot 10. Time slot priority register R1 may contain the time slots 11–20, the upper bit of the time slot 10, and a lowest bit of time slot 21. Time slot priority register R2 may contain the time slots 22–31 and the upper two bits of time slot 21.

The registers 140 may be programmed during initialization of the system 100. The registers 140 may be changed or may remain unchanged during normal operation. A non-deterministic arbitration may result while writing to the registers 140. Table V generally shows an example criteria for arbitration priority among the ports 102a–n. Table VI generally shows an example allocation of the time slots 154a–x for the ports 102a–n per the criteria in Table V.

TABLE V

| Port Number | Percentage Bandwidth | Number of Time Slots |
|---|---|---|
| 0 | 50% | 16 |
| 1 | 25% | 8 |
| 2 | 9.4% | 3 |
| 3 | 3.1% | 1 |
| 4 | 3.1% | 1 |
| 5 | 3.1% | 1 |
| 6 | 3.1% | 1 |
| 7 | 3.1% | 1 |

TABLE VI

| Time Slot Number | Port Number |
| --- | --- |
| 0 | 0 |
| 1 | 1 |
| 2 | 0 |
| 3 | 2 |
| 4 | 0 |
| 5 | 1 |
| 6 | 0 |
| 7 | 3 |
| 8 | 0 |
| 9 | 1 |
| 10 | 0 |
| 11 | 2 |
| 12 | 0 |
| 13 | 1 |
| 14 | 0 |
| 15 | 4 |
| 16 | 0 |
| 17 | 1 |
| 18 | 0 |
| 19 | 2 |
| 20 | 0 |
| 21 | 1 |
| 22 | 0 |
| 23 | 5 |
| 24 | 0 |
| 25 | 1 |
| 26 | 0 |
| 27 | 6 |
| 28 | 0 |
| 29 | 1 |
| 30 | 0 |
| 31 | 7 |

The example allocations may be implemented by writing values 0x0860_8488, 0x8408_8884 and 0xE08C_08A9 to the time slot priority registers R0, R1 and R2, respectively.

Figure 4:
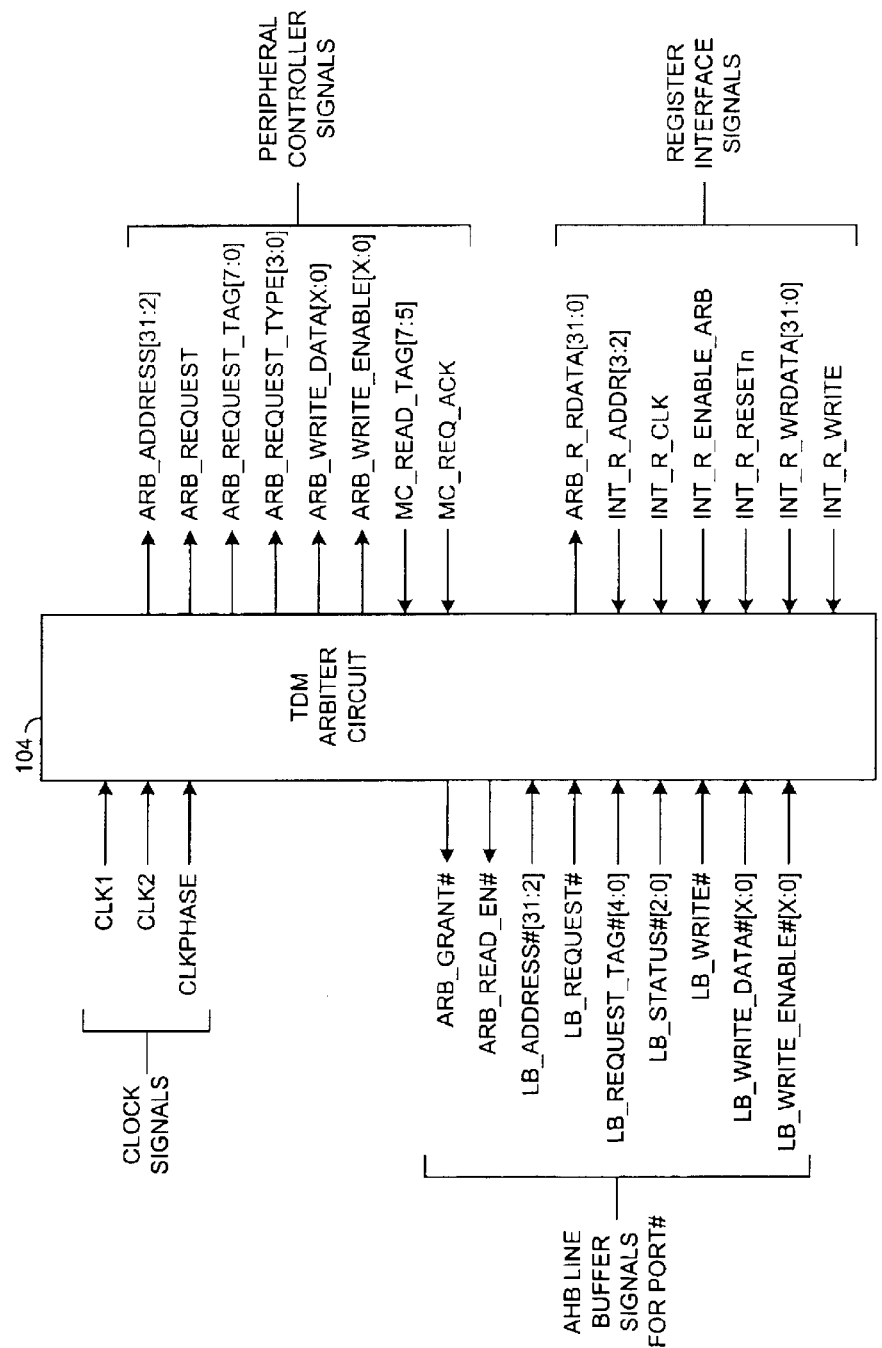
FIG. 4 is a block diagram of an example input/output implementation for the TDM arbiter circuit.

Referring to FIG. 4, a block diagram of an example input/output implementation for the TDM arbiter circuit 104 is shown. In one embodiment, the TDM arbiter circuit 104 may treat all data as little endian. In another embodiment, the TDM arbiter circuit 104 may treat all data as big endian.

The top-level system 100 generally defines two internal clocks. A first internal clock may be the 1× clock (e.g., CLK1). A second internal clock may be the 2× clock (e.g., CLK2). The TDM arbiter circuit 104 generally uses the 2× clock along with a clock enable signal (e.g., CLKPHASE) to identify a relationship of the clock signal CLK1 phases to the clock signal CLK2. The signal CLKPHASE may be a delayed version of clock signal CLK1. In general, a rising edge of the clock signal CLK1 may equal a rising edge of the clock signal CLK2 while signal CLKPHASE may be deasserted. A falling edge of the clock signal CLK1 may equal a rising edge of the clock signal CLK2 while the signal CLKPHASE may be asserted.

The TDM arbiter circuit 104 may receive a configuration port clock (e.g., INT_R_CLK). The clock signal INT_R_CLK may be used to read and write the three control registers 140. The clock signal CLK2 may be used for all other registers (not shown). The clock signal INT_R_CLK may be synchronous to the clock signal CLK2 and may be either the same frequency or an integer multiple frequency slower than the clock signal CLK2.

A reset signal (e.g., INT_R_RESETN) may be used to reset the TDM arbiter circuit 104 and the system 100. The reset function may be a synchronous reset. A reset state may be asserted for at least one cycle of the clock signal CLK2 or one cycle of the clock signal INT_R_CLK, whichever may be longer.

Several read enable signals (e.g., ARB_READ_EN#, where a≦#≦n) may be generated by decoding information in a signal (e.g., MC_READ_TAG[7:5]) from the peripheral controller circuit 108. The actual read data from the peripheral device 110 may flow through the TDM arbiter circuit 104 unmodified from the peripheral controller circuit 108 to the AHB bus interface circuits 102a–n.

Multiple ports 102a–n may be supported by the TDM arbiter circuit 104. Each port 102a–n may have a same set of interface signals as seen by the TDM arbiter circuit 104. Names for the interface signal sets may be differentiated by using the respective port numbers as a suffix. The widths of the write data and byte write enable buses may be defined with a compile time option. The port numbers may be replaced by a "#" in the following signal descriptions.

The interfaces of the TDM arbiter circuit 104 to the AHB bus interface circuits 102a–n generally comprises arbitration signals, read/write signals, and status signals. The AHB bus interface circuit signals may be as follows in Table VII:

TABLE VII

| Signal Description | I/O |
| --- | --- |
| Transaction Grant (e.g., ARB_GRANT#) An active high signal from the TDM arbiter circuit to the AHB bus interface block generally indicating the request has been accepted. Driven on the rising edge of CLK1. | Out |
| Read Enable (e.g., ARB_READ_EN#) A single bit decode that may asserted when the current read data may owned by the respective AHB bus interface circuit. Driven on the rising edge of CLK1. | Out |
| Request Address (e.g., LB_ADDRESS# [31:2]) An address of the AHB bus interface circuit making a request. Driven on the rising edge of CLK1 | In |
| Transaction Request (e.g., LB_REQUEST#) An AHB bus interface circuit active high signal to the TDM arbiter circuit that a memory request may be active. The signal may be asserted on a falling edge of clock CLK1 and held asserted until the signal ARB_GRANT signal may be asserted. The AHB bus interface circuit may then negate the signal on a next falling edge of clock CLK1. Driven on the falling edge of CLK1. | In |
| Request Tag (e.g., LB_REQUESTE_TAG#) A five bit quantity generally managed by the AHB bus interface circuit to recognize a particular request. The TDM arbiter circuit and the peripheral controller circuit may merely pass on the value until the read results may be returned to the AHB bus interface circuit. Driven on the rising edge of CLK1. | In |
| Status (e.g., LB_STATUS# [2:0]) A three bit encoded value sent from the AHB bus inter-face circuit to the TDM arbiter circuit that may indicate a transaction status. Bit 0 may represent the state of a signal (e.g., HLOCK) for the current transfer. Driven on the rising edge of CLK1. | In |
| Write/nRead (e.g., LB_WRITE_DATA# [X:0]) Active high write and active low read. Driven on the rising edge of CLK1. | In |
| Write Data (e.g., LB_WRITE_DATA# [X:0]) A multiplexed write data from the AHB bus interface circuit to the peripheral controller circuit via an arbiter data path multiplexer. The bus width may be 32, 64, 128, or 144 bits and may be set as a compile time option. Driven on the rising edge of CLK2. | In |
| Byte Write Enable | In |

TABLE VII-continued

| Signal Description | I/O |
|---|---|
| (e.g., LB_WRITE_ENABLE# [X:0]) An active high write enable for each byte of write data. The width of the byte write enable may depend on the data width, which may be set as a compile time option. Driven on the rising edge of CLK2. | |

Register interface signals may used to read and write the registers 140. The register interface signals may be synchronous with respect to the clock signal INT_R_CLK. The clock signal INT_R_CLK may be synchronous (e.g., same frequency or slower) to the clock signal CLK2. The register interface signal may be as follows as shown in Table VIII:

TABLE VIII

| Signal Description | I/O |
|---|---|
| Register Bus Read Data (e.g., ARB_R_RDATA [31:0]) The arbiter may place the register data corresponding to INT_R_ADDR on a register bus. The read data bus may be up to 32-bits wide. The signal may be derived from combinational logic and may be valid on the rising edge of INT_R_CLK. | Out |
| Register Bus Address (e.g., INT_R_ADDR [3:2]) An address bus that may be 2 bits to allow decoding of the three registers in the TDM arbiter circuit. Bits 0 and 1 may not be included because the AHB may use word addressing. Driven on the rising edge of INT_R_CLK. | In |
| Register Bus Clock (e.g., INT_R_CLK) A rising edge of INT_R_CLK may be used to time transfers on a register bus. | In |
| Register Bus Enable (e.g., INT_R_ENABLE_ARB) Generally indicates that the transfer on the register bus may be intended for the TDM arbiter circuit. Driven on the rising edge of INT_R_CLK. | In |
| Register Bus Reset (e.g., INT_R_RESETN) May be active LOW and may be synchronous with respect to INT_R_CLK. | In |
| Register Bus Write Data (e.g., INT_R_WRDATA[31:0]) May contain write data for write transfers. The write data bus may be up to 32-bits wide. Driven on the rising edge of INT_R_CLK. | In |
| Register Bus Write (e.g., INT_R_WRITE) A logical HIGH may indicate an AHB write access and a logical LOW may indicate a read access. Driven on the rising edge of INT_R_CLK. | In |

Signals between the TDM arbiter circuit 104 and the peripheral controller circuit 108 may comprise read/write signals, address signals and control signals. The arbiter-peripheral controller signals may identify to the peripheral controller circuit 108 the port 102*a–n* currently having access. The arbiter-peripheral controller signals may be as follows as shown in Table IX:

TABLE IX

| Signal Description | I/O |
|---|---|
| Request Address (e.g., ARB_ADDRESS[31:2]) An address of the AHB bus interface circuit making a request. Driven on the rising edge of clock CLK1. | Out |
| Transaction Request (e.g., ARB_REQUEST) An active high signal to the peripheral controller circuit that a memory request may be needed. The signal may be asserted on the rising edge of clock CLK1 and held asserted for only one clock. Driven on the rising edge of CLK1. | Out |
| Request Tag (e.g., ARB_REQUEST_TAG[7:]) An eight bit quantity generally used to recognize a particular request. The TDM arbiter circuit may append a three bit AHB bus interface circuit address and send to the peripheral controller circuit. The peripheral controller circuit merely passes on the value until the read results may be returned to the AHB bus interface circuit. The TDM arbiter circuit may then uses MC_READ_TAG[7:5] to decode the request source. Driven on the rising edge of CLK1. | Out |
| Request Type (e.g., ARB_REQUEST_TYPE[3:0]) May indicate a read or write request. For some arbiter/peripheral combinations (e.g., a DDR controller), more requests types may be defined (e.g., precharge, activate, refresh, etc.). The request types may include no-op, refresh, precharge, active, write, and read. Driven on the rising edge of CLK1. | Out |
| Write Data (e.g., ARB_WRITE_DATA[X:0]) Multiplexed write data from the AHB bus interface circuit to the peripheral controller circuit via the arbiter data path multiplexer. The bus width may be 32, 64, 128, or 144 bits and may be set as a compile time option. Driven on the rising edge of CLK2. | Out |
| Byte Write Enable (e.g., ARB_WRITE_ENABLE[X:0]) An active high write enable for each byte of write data. The width of the byte write enable may depend on the LB_WRITE_DATA width and may be set as a compile time option. Driven on the rising edge of CLK2. | Out |
| Read Tag (e.g., MC_READ_TAG[7:5]) The three-bit request tag returned by the peripheral controller circuit that may recognize a particular read request source. The three bits may be the LB_REQUEST_TAG sent during the request by the AHB bus interface circuit. Driven on the rising edge of CLK1. | In |
| Transaction Request Acknowledge (e.g., MC_REQ_ACK) Active high signal from the peripheral controller circuit to the TDM arbiter circuit generally indicating that there may be room for another request to be accepted. The signal may be active for one clock cycle per request. Driven on the falling edge of CLK1. | In |

Referring to FIGS. 5–12, timing diagrams for various operations of the system 100 are shown. Delays from the AHB bus interface circuits 102*a–n* and the peripheral controller circuit 108 shown may be arbitrary and may be quite different in a given situation.

Figure 5:
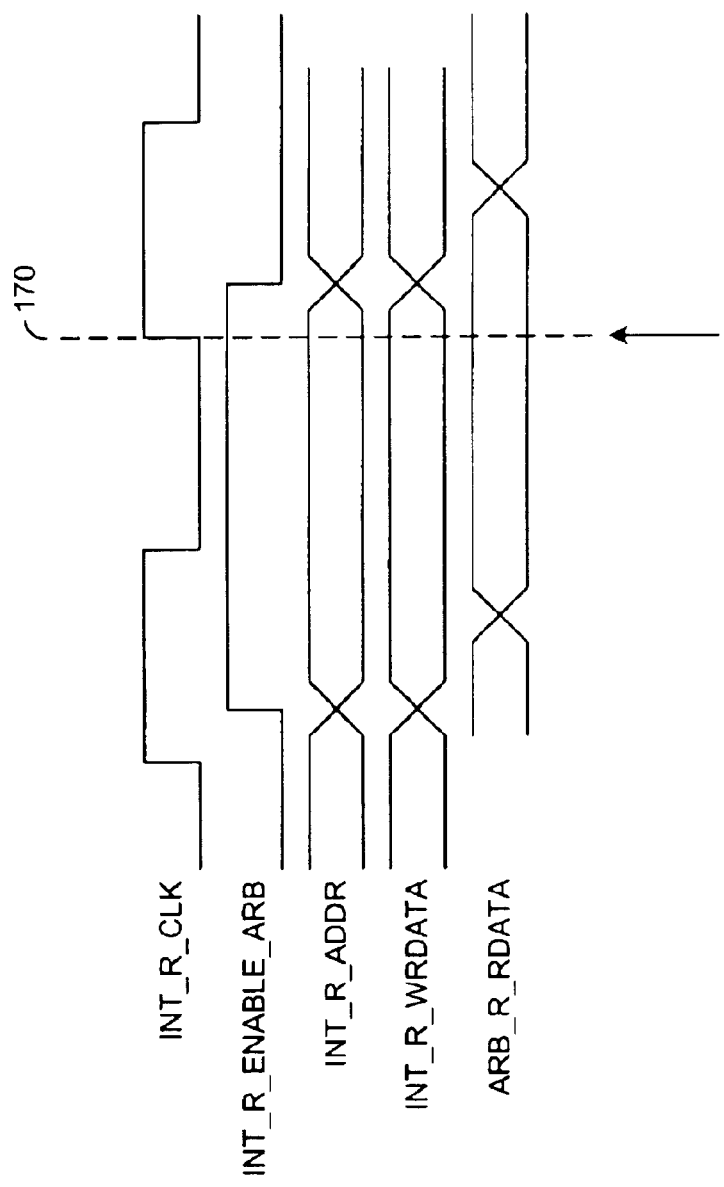
FIG. 5 is a functional timing diagram for a register bus interface timing.

Referring to FIG. 5, a functional timing diagram for the register bus interface timing is shown. The register bus interface generally uses a synchronous write and an asynchronous read interface. The signal ARB_R_DATA may be captured on a rising edge of the clock INT_R_CLK at a time 170. The data may then be passed on to an AHB signal (e.g., HRDATA) during a next clock cycle by the register bus interface logic. Therefore, there may be a wait period for an AHB control circuit 106 read of the data.

Figure 6:
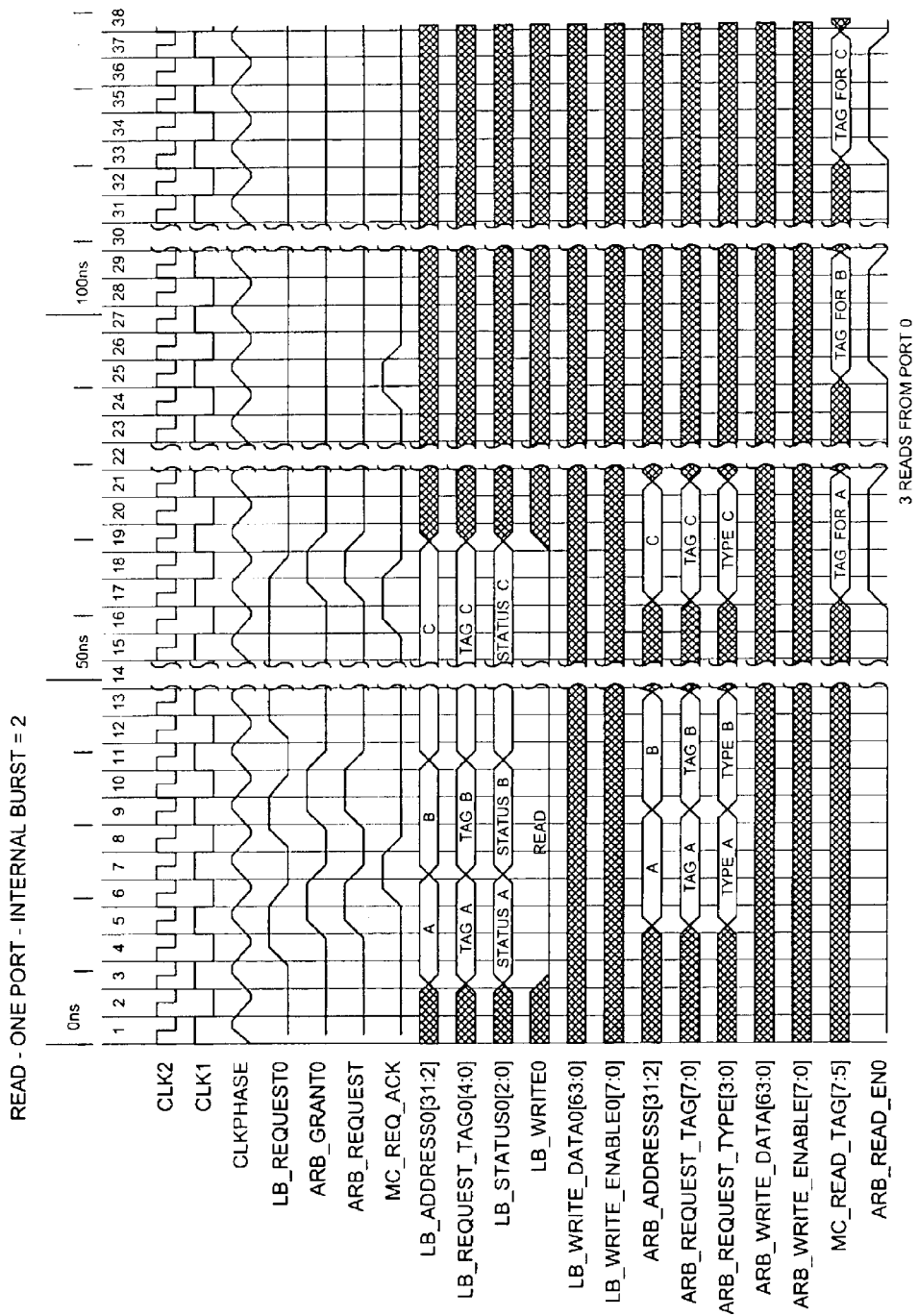
FIG. 6 is a functional timing diagram of example back-to-back read transactions from a port.

Referring to FIG. 6, a functional timing diagram of example back-to-back read transactions from a port 102a–n is shown. The signal MC_READ_TAG information, generally indicating the read data may be available for the port 102a–n, may occur an undefined time after the request to the peripheral controller circuit 108.

Figure 7:
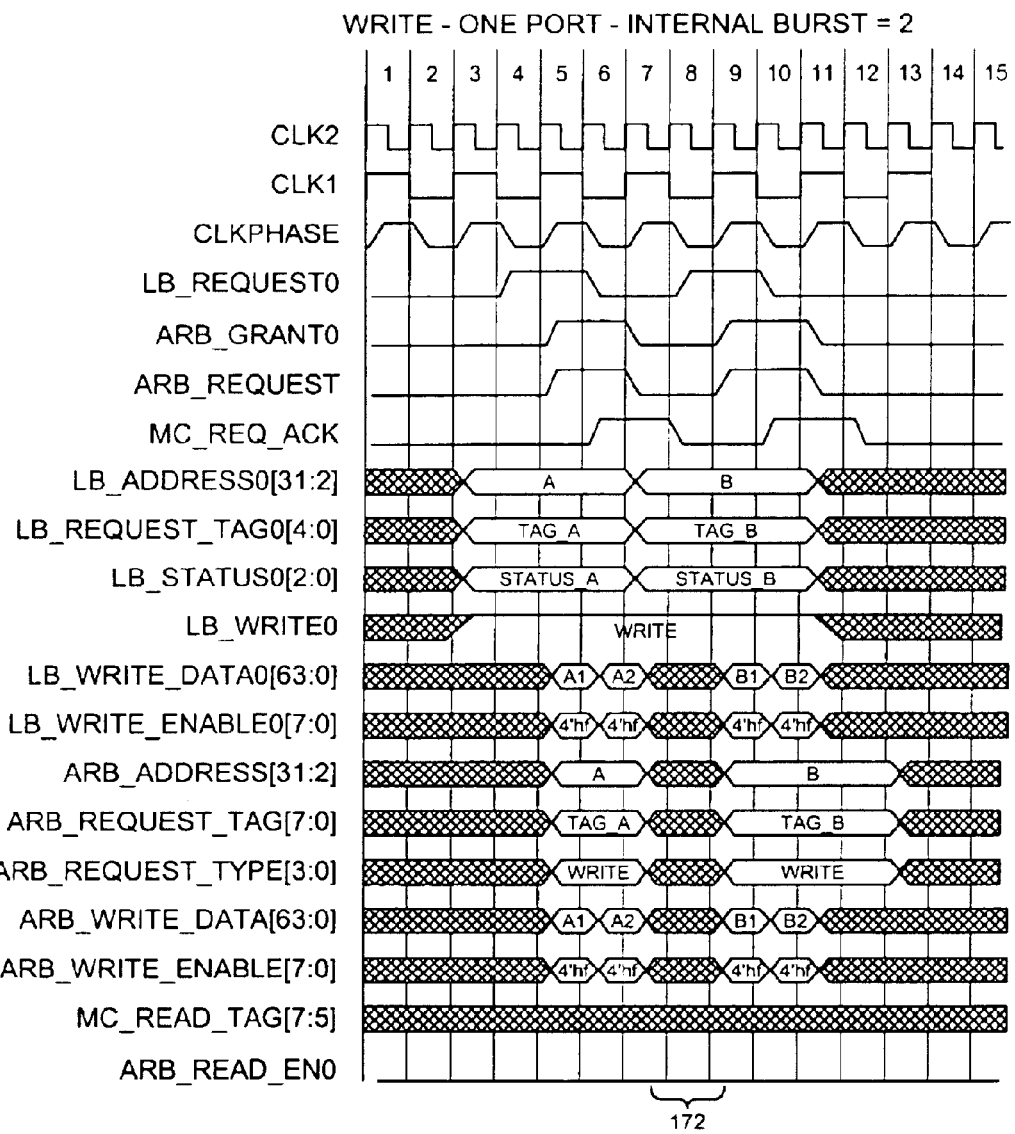
FIG. 7 is a functional timing diagram of example back-to-back write transactions from a port using an internal burst of two data beats.

Referring to FIG. 7 a functional timing diagram of example back-to-back write transactions from a port 102a–n using an internal burst of two data beats is shown. The port 102 to TDM arbiter circuit 104 request/grant handshake generally takes two clock CLK1 cycles to complete so there may be an idle cycle 172 on the write data bus between transfers for a two data beat burst.

Figure 8:
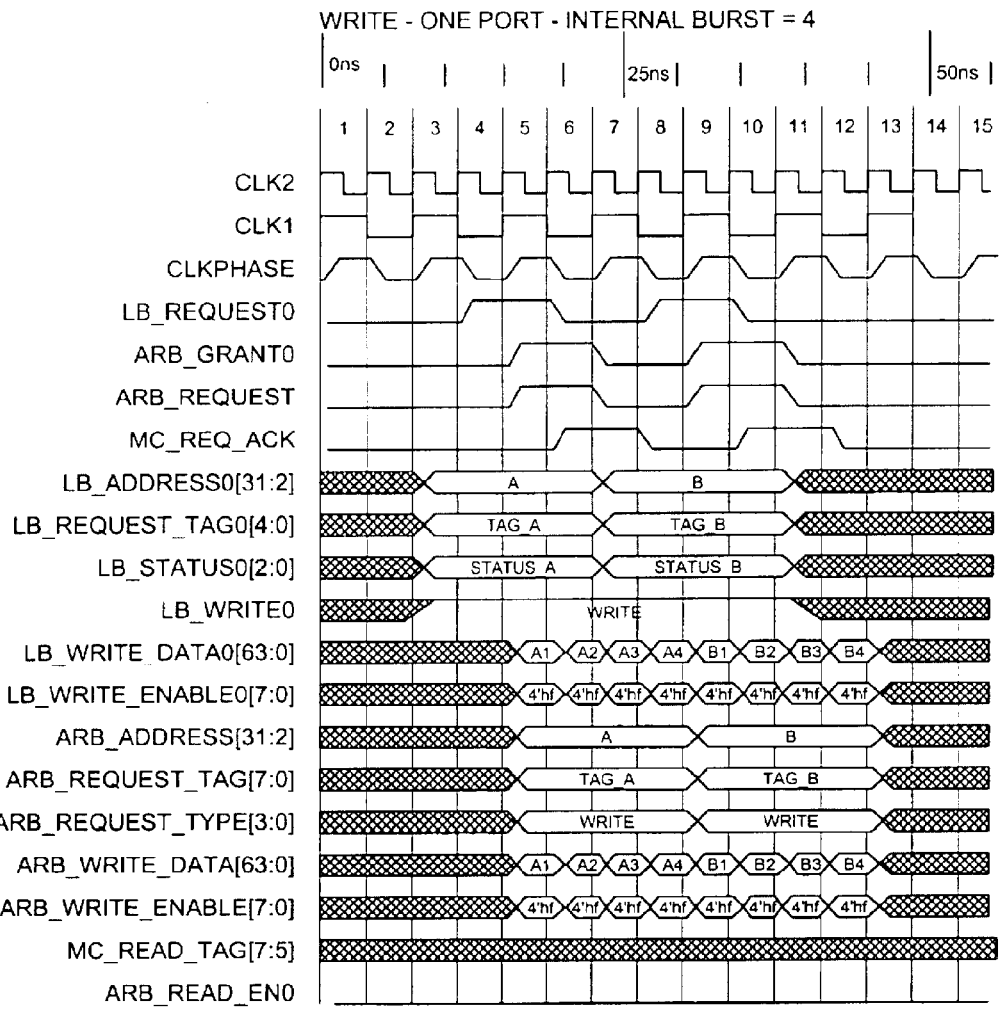
FIG. 8 is a function timing diagram of example back-to-back write transactions from a port using an internal burst of four data beats.

Referring to FIG. 8 a function timing diagram of example back-to-back write transactions from a port 102a–n using an internal burst of four data beats is shown. With the four data beat internal burst, no idle time may exist on the write data bus.

Figure 9:
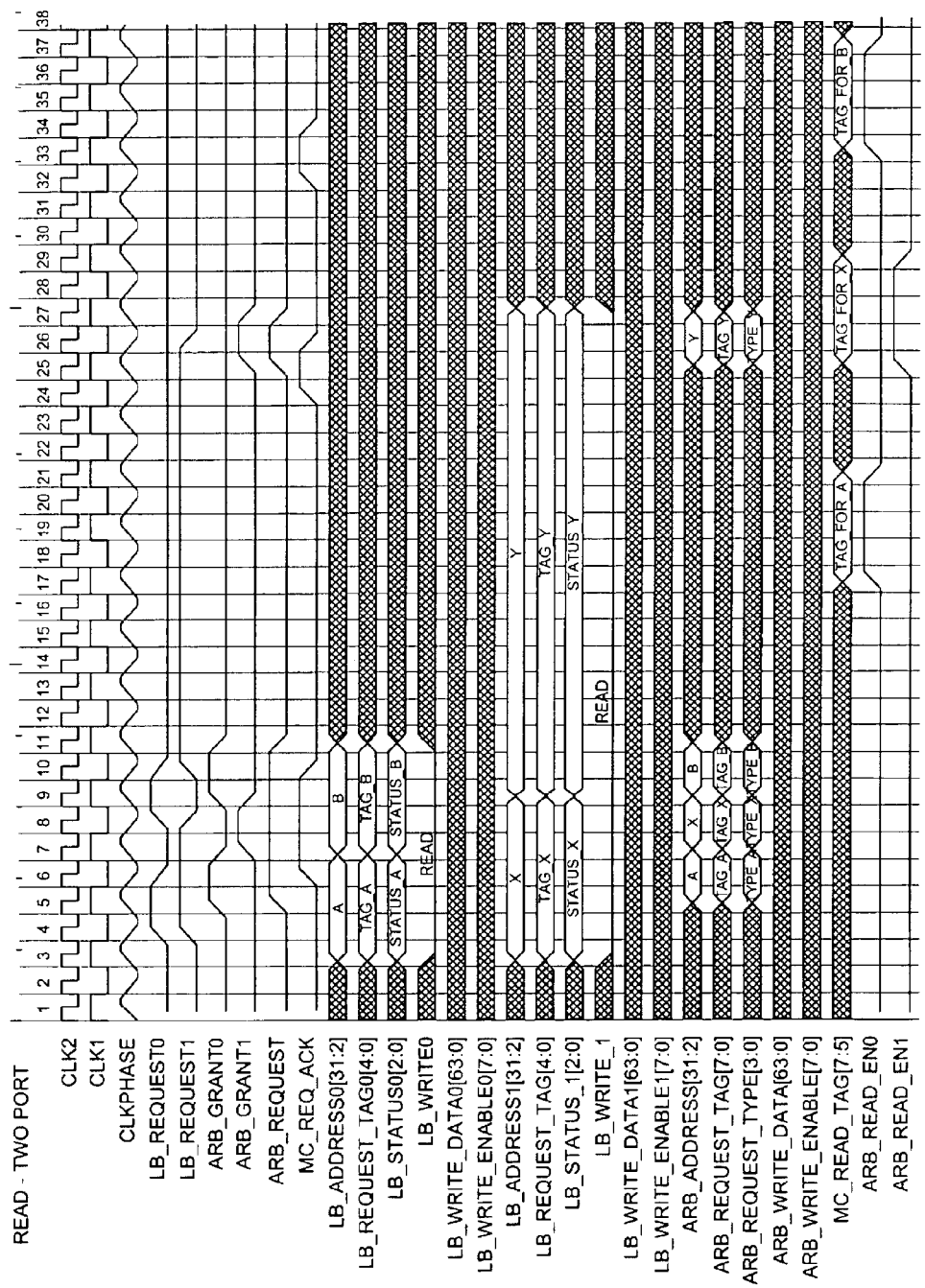
FIG. 9 is a functional timing diagram of three example read transactions in a row from two different ports.

Referring to FIG. 9, a functional timing diagram of three example read transactions in a row from two different ports 102a–n is shown. Different ports may be granted access on each clock CLK1 cycle where the peripheral controller circuit 108 may acknowledge (e.g., MC_REQ_ACK) as soon as possible.

Figure 10:
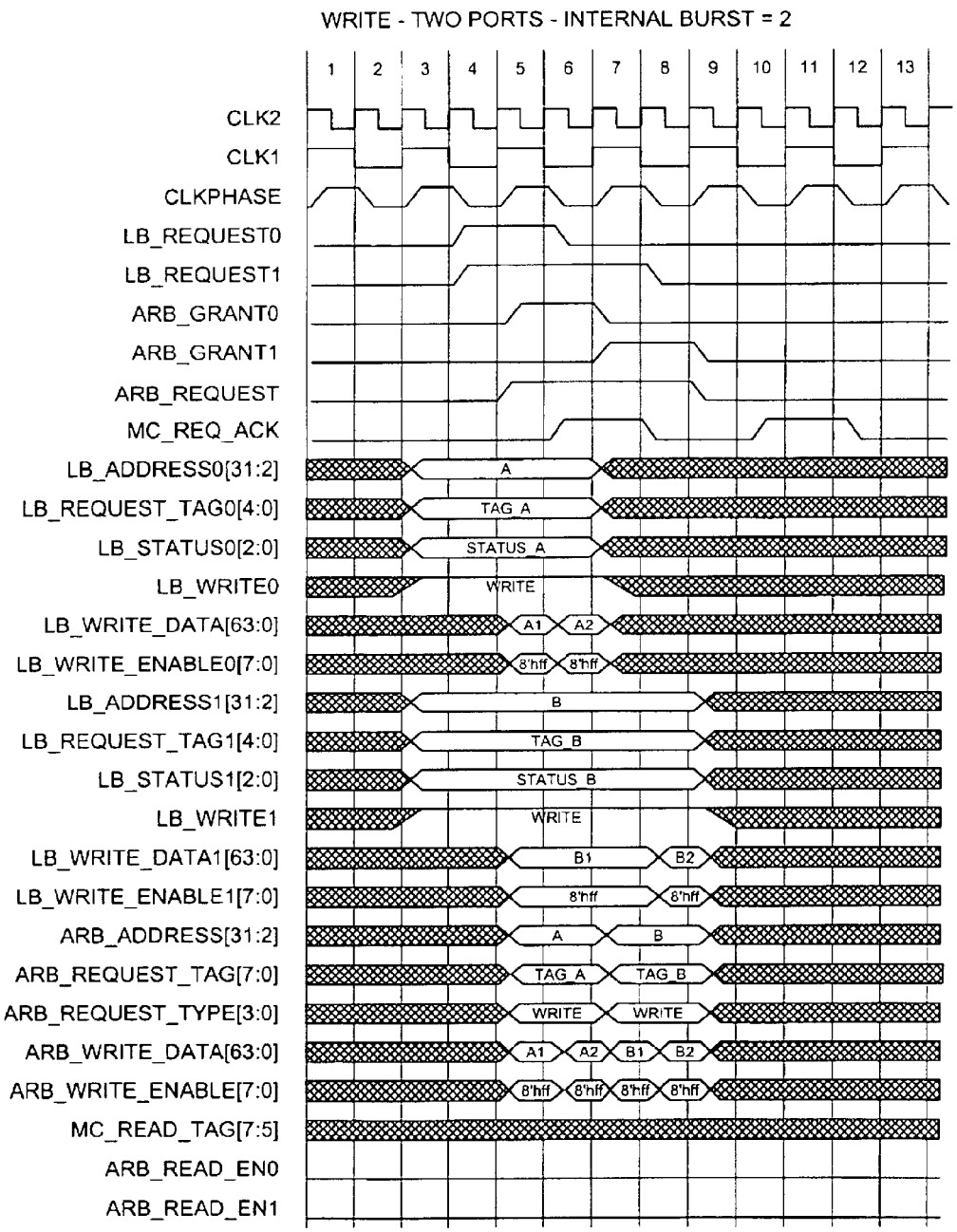
FIG. 10 is a functional timing diagram of example back-to-back write transaction from two different ports.

Referring to FIG. 10, a functional timing diagram of example back-to-back write transaction from two different ports 102a–n is shown. For internal write bursts of two data beats, grants may be issued back-to-back to two different ports 102a–n.

Figure 11:
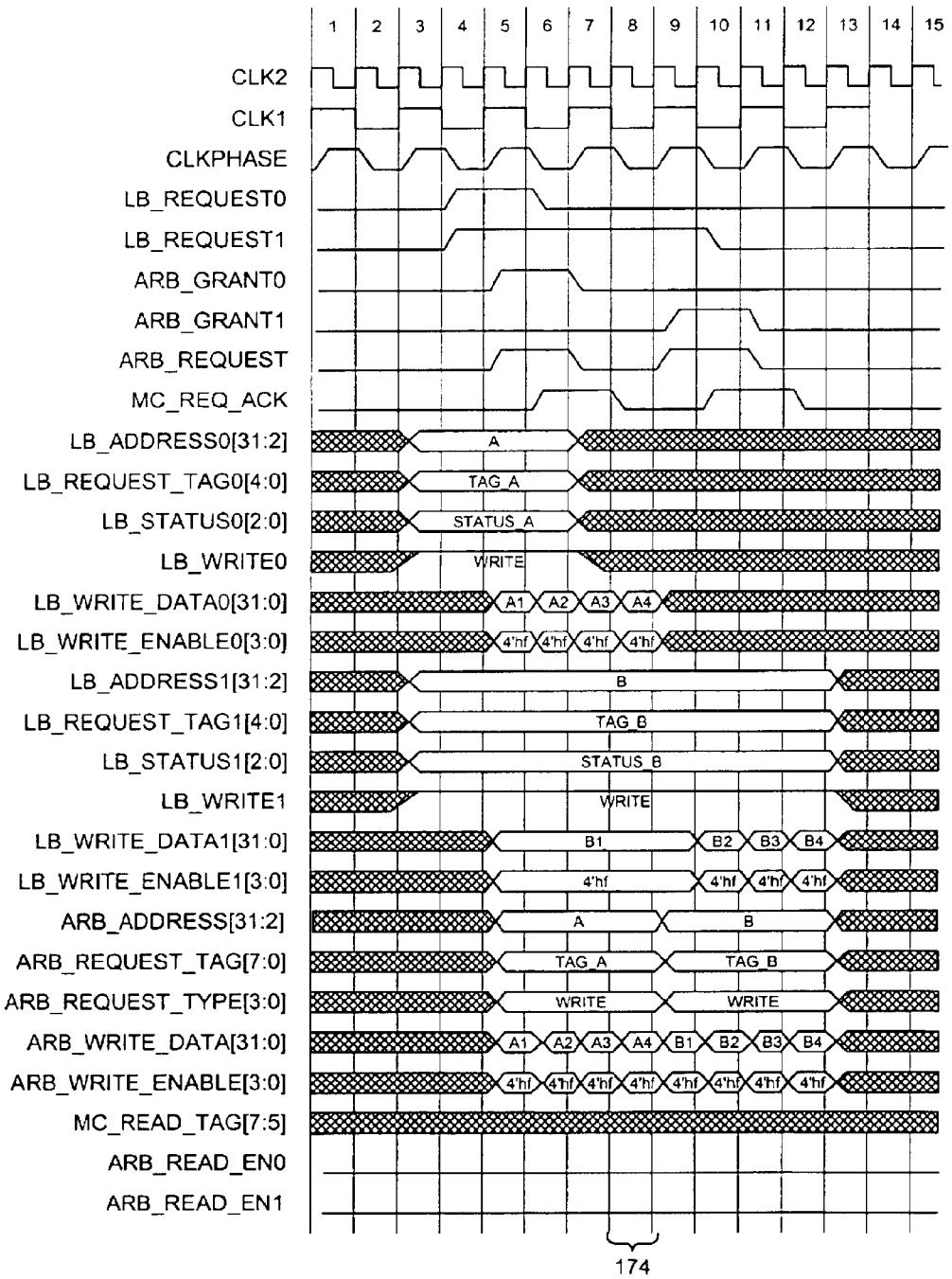
FIG. 11 is a function timing diagram of example back-to-back write transactions from two different ports.

Referring to FIG. 11, a function timing diagram of example back-to-back write transactions from two different ports 102a–n is shown. In general, for internal write bursts of four data beats, grants may not be issued back-to-back to two different line buffer ports 102. An idle cycle 174 may exist between grants to allow all of the write data to be transferred.

Figure 12:
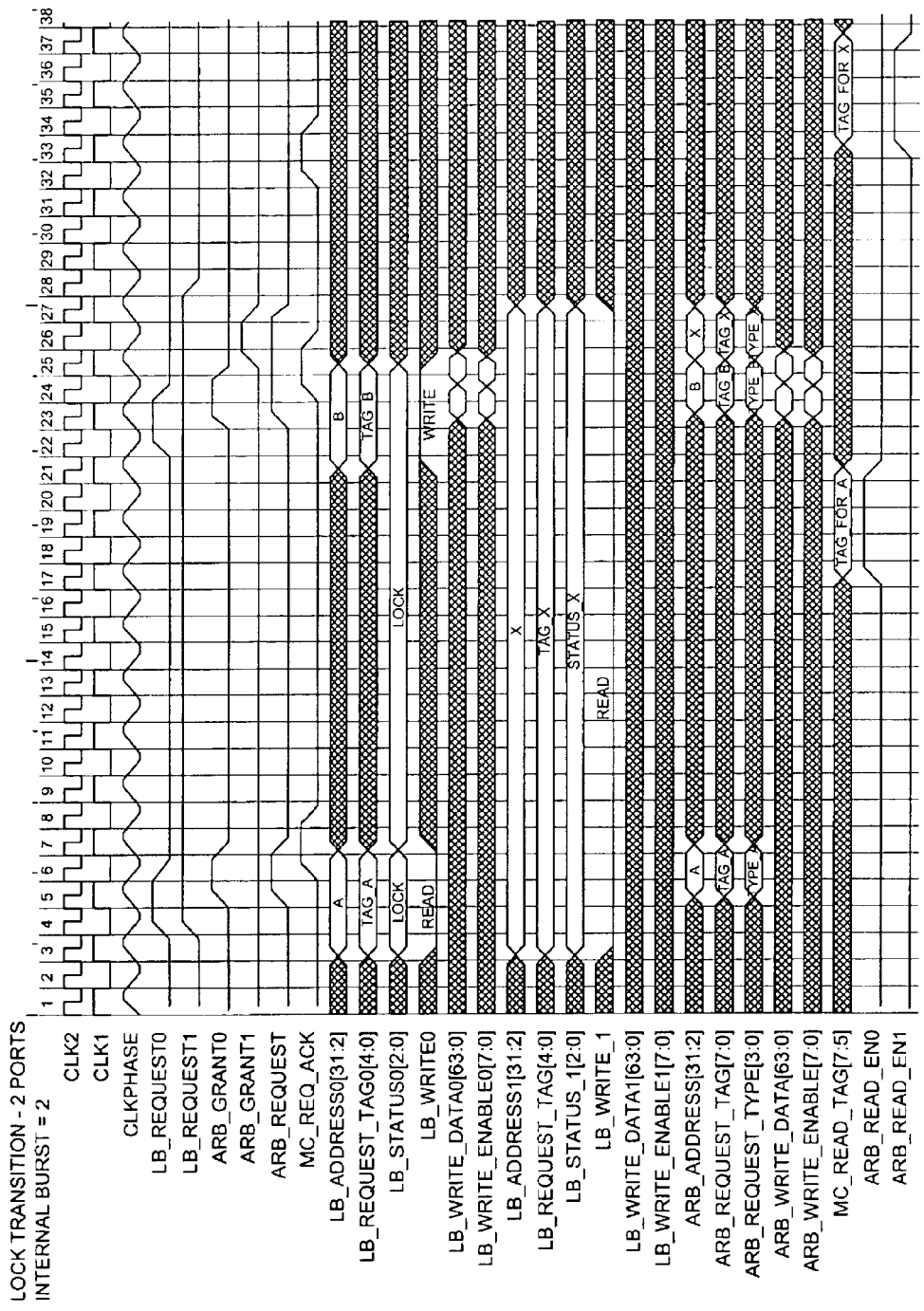
FIG. 12 is a functional timing diagram of an example lock transaction.

Referring to FIG. 12, a functional timing diagram of an example lock transaction is shown. A processor (not shown) communicating with the peripheral controller circuit 108 through the TDM arbiter circuit 104 and an AHB bus interface circuit 102a–n may use a lock transaction for read-modify-write type commands. The port 102a–n may drive the signal LB_STATUS between the read and write transactions to hold the arbitration in a lock state. The arbitration scheme generally may not grant a new port 102a–n until the signal LB_STATUS for the locked port 102a–n may be reset back to a unlock state.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals. The various signals of the present invention may be implemented as single-bit or multi-bit signals in a serial and/or parallel configuration.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
   an interface circuit couplable between a peripheral device and a plurality of ports; and
   an arbitration circuit coupled to said interface circuit and configured to (i) store a plurality of associations that are user programmable between a plurality of time slots and said ports, (ii) check said associations in a subset comprising at least two of said slots in response to receiving an arbitration request from a first requesting port of said ports, and (iii) generate a grant for said first requesting port to communicate with said peripheral device in response to said first requesting port matching at least one of said associations in said subset.

2. The circuit according to claim 1, wherein said interface circuit comprises a state machine configured to control a handshake with said peripheral device.

3. The circuit according to claim 2, wherein said interface circuit further comprises a decode circuit configured to transfer a plurality of enable signals to said ports in response to a read signal received from said peripheral device.

4. The circuit according to claim 1, wherein said arbitration circuit comprises:
   a logic circuit configured to perform arbitration among said ports; and
   a state machine configured to control a timing of said grant in response to said ports.

5. The circuit according to claim 4, wherein said arbitration circuit further comprises at least one register configured as said time slots each storing one of a plurality of numbers identifying said ports.

6. The circuit according to claim 1, further comprising a plurality of first interfaces each configured to receive a first signal from a respective one of said ports that distinguishes among a plurality of access requests to said peripheral device.

7. The circuit according to claim 6, further comprising a second interface configured to generate a second signal for said peripheral device that identifies a particular access request of said access requests from a particular port of said ports to be serviced.

8. The circuit according to claim 7, further comprising a third interface configured to receive a third signal from said peripheral device identifying said particular port.

9. The circuit according to claim 8, further comprising a plurality of fourth interfaces each configured to generate a fourth signal indicating service to said particular port.

10. The circuit according to claim 1, further comprising an interface configured to generate a signal indicating a type of transaction requested of said peripheral device.

11. The circuit according to claim 1, further comprising a plurality of bus interface circuits (i) connected to said interface circuit, (ii) each couplable to one of a plurality of busses and (iii) configured as said ports.

12. The circuit according to claim 11, wherein each of said bus interface circuits is compliant with an Advanced Microcontroller Bus Architecture specification.

13. The circuit according to claim 12, wherein said peripheral device comprises a memory controller configured to control a memory circuit.

14. The circuit according to claim 13, wherein said memory circuit comprises a double data rate memory circuit.

15. The circuit according to claim 1, further comprising:
   a plurality of control registers for configuring said circuit; and
   a control circuit configured to transfer information between said control registers and a bus compliant with an Advanced Peripheral Bus standard in an Advanced Microcontroller Bus Architecture specification.

16. A method of circuit arbitration, comprising the steps of:
   (A) storing a plurality of associations that are user programmable between a plurality of time slots and a plurality of ports;
   (B) checking said associations in a subset comprising at least two of said time slots in response to receiving an arbitration request from a first requesting port of said ports; and
   (C) generating a grant for said first requesting port to communicate with a peripheral device in response to said first requesting port matching at least one of said associations in said subset.

17. The method according to claim 16, further comprising the step of denying said grant for a second requesting port of said ports to communicate with said peripheral device in response to said first requesting port matching a first time slot in said subset having a higher priority than a second time slot in said subset matching said second requesting port.

18. The method according to claim 17, wherein said first time slot has a lower priority than a highest priority in said subset.

19. The method according to claim 16, further comprising the step of moving said time slots a number of units relative to said subset so that said subset includes a different collection of said time slots.

20. The method according to claim 19, further comprising the step of determining said number in response to a position of said first requesting port receiving said grant within said subset.

21. The method according to claim 16, further comprising the step of receiving an approval from a second requesting port of said ports prior to generating said grant to said first requesting port.

22. The method according to claim 16, further comprising the step of receiving an approval from said peripheral prior to generating said grant to said first requesting port.

23. The method according to claim 16, wherein said generating step comprises the sub-steps of:
   generating said grant for said first requesting port to communicate with said peripheral device in response to said first requesting port matching at least one of said associations in said subset; and
   generating said grant in a fixed priority scheme in response to said associations in said subset matching none of said ports requesting access.

24. The method according to claim 16, wherein said time slots in said subset are contiguous.

25. A circuit comprising:
   means for storing a plurality of associations that are user programmable between a plurality of time slots and a plurality of ports;
   means for checking said associations in a subset comprising at least two of said time slots in response to receiving an arbitration request from a first requesting port of said ports; and
   means for generating a grant for said first requesting port to communicate with a peripheral device in response to said first requesting port matching at least one of said associations in said subset.

* * * * *